United States Patent [19]

Orenzow

[11] 4,222,034
[45] Sep. 9, 1980

[54] VEHICULAR PROTECTIVE SYSTEM

[76] Inventor: Samuel Orenzow, 2244 Bronx Park East, New York, N.Y. 10467

[21] Appl. No.: 39,346

[22] Filed: May 16, 1979

[51] Int. Cl.² ............................................. B60R 25/04
[52] U.S. Cl. .............................. 340/64; 307/10 AT; 180/287
[58] Field of Search .............. 340/63, 64; 307/10 AT; 180/287

[56] References Cited

U.S. PATENT DOCUMENTS 4,125,826  11/1978  Rasmussen et al. .................... 340/63

*Primary Examiner*—Alvin H. Waring
*Attorney, Agent, or Firm*—Daniel Jay Tick

[57] ABSTRACT

An ultrasonic transmitter is combined with an ignition key of an automotive vehicle and is manually operable to produce and transmit an ultrasonic signal. An ultrasonic receiver has an electronic switch electrically connected to at least one of the components of the electrical system of the vehicle and between said one of said components and another one of the components of the electrical system. The switch is open upon the failure of the receiver to receive the signal transmitted by the transmitter thereby preventing the operation of the electrical system and the operation of the vehicle. The receiver closes the switch upon receiving the signal transmitted by the transmitter thereby permitting the operation of the electrical system and the operation of the vehicle.

8 Claims, 5 Drawing Figures

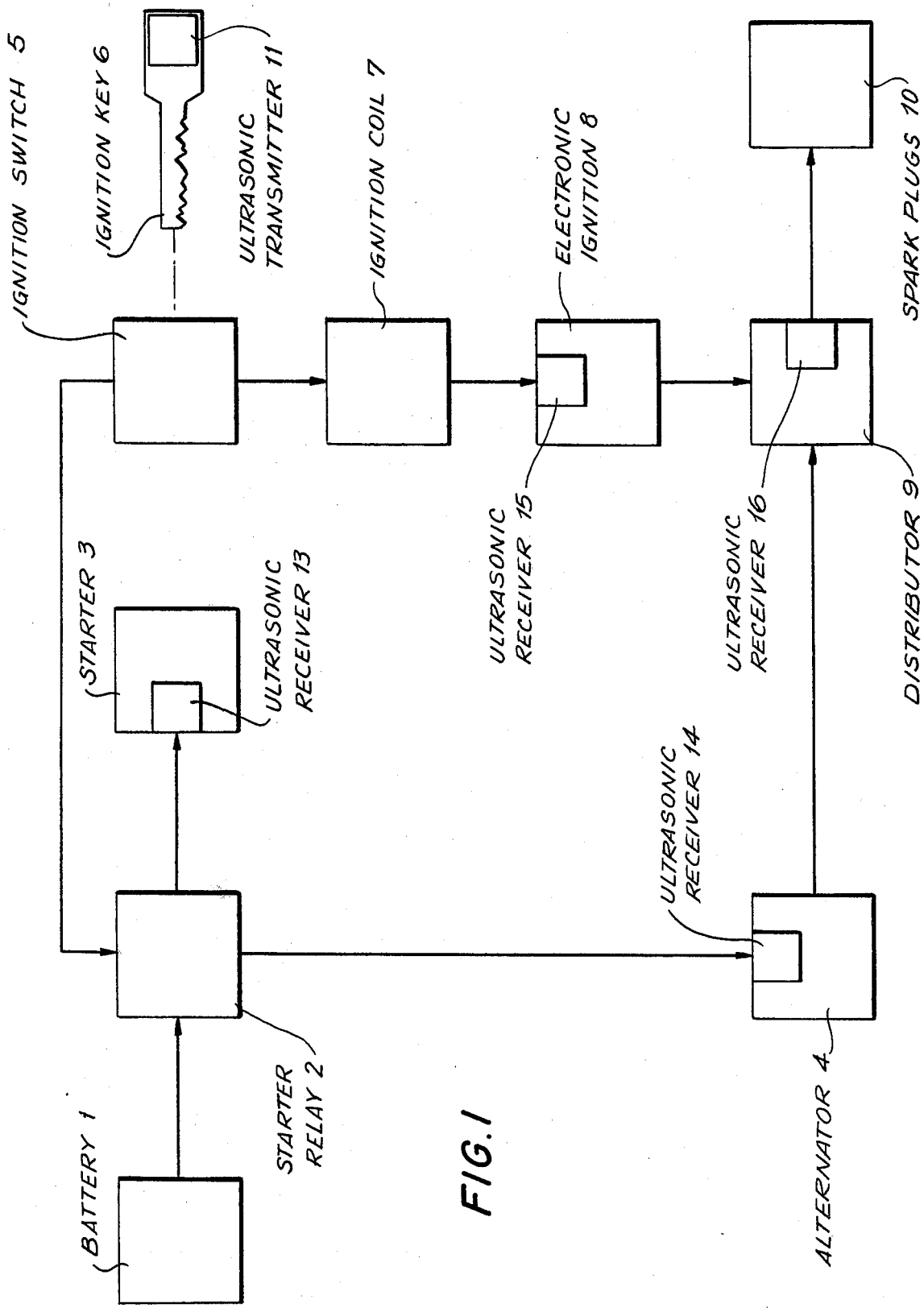

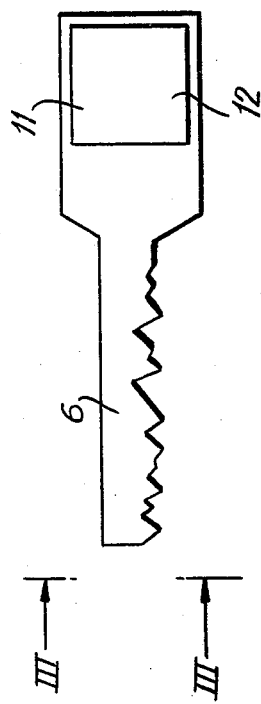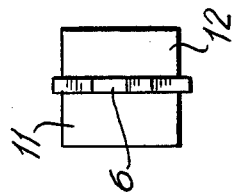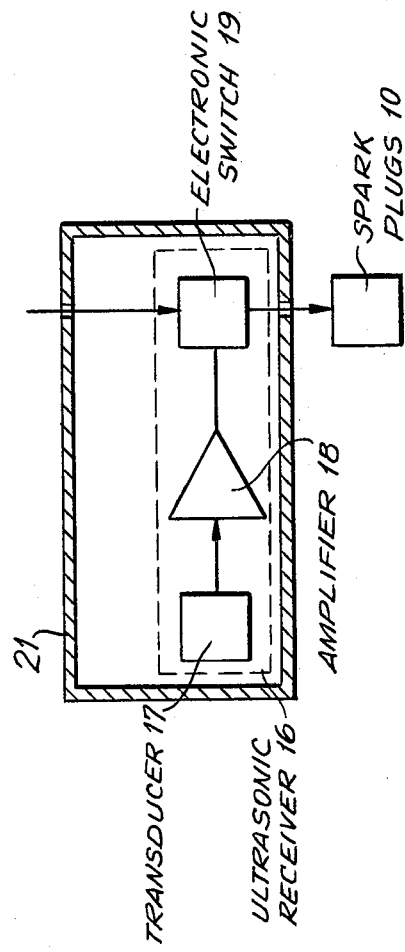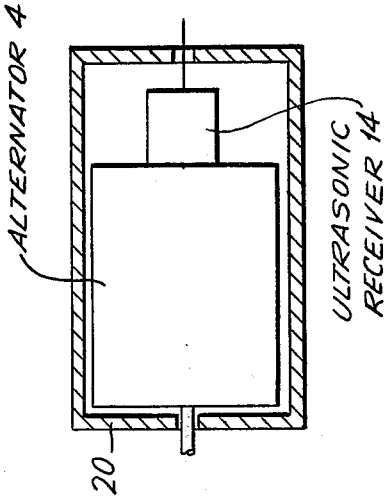

VEHICULAR PROTECTIVE SYSTEM

BACKGROUND OF THE INVENTION

The present invention relates to a vehicular protective system.

There are a great many known vehicular protective systems which attempt to protect automotive vehicles from theft. Most of these systems have a serious shortcoming, since they may be negated by an unauthorized person using jump wires.

The principal object of the invention is to provide a vehicular protective system of simple structure for preventing unauthorized operation of an automotive vehicle and which cannot be negated by jump wires.

An object of the invention is to provide a vehicular protective system which is readily installable in automotive vehicles of any type and age and functions efficiently, effectively and reliably to prevent unauthorized operation of an automotive vehicle.

Another object of the invention is to provide a vehicular protective system of simple structure, which is safe in operation, functions efficiently, effectively and reliably to prevent unauthorized operation of an automotive vehicle, and cannot be negated by jump wires.

BRIEF SUMMARY OF THE INVENTION

In accordance with the invention, a vehicular protective system for preventing unauthorized operation of an automotive vehicle having an electrical system including a plurality of components and an ignition system having a plurality of components and started by an ignition key comprises an ultrasonic transmitter combined with the ignition key and manually operable to produce and transmit an ultrasonic signal. An ultrasonic receiver has an electronic switch electrically connected to at least one of the components of the electrical system of a vehicle and between said one of said components and another one of the components of said electrical system. The switch is open upon the failure of the receiver to receive the signal transmitted by the transmitter thereby preventing the operation of the electrical system and the operation of the vehicle. The receiver closes the switch upon receiving the signal transmitted by the transmitter, thereby permitting the operation of the electrical system and the operation of the vehicle.

A sealed housing houses the one of the components and the ultrasonic receiver to prevent tampering with the one of the components and with the ultrasonic receiver.

The components include a starter, a starter relay, an alternator and an ignition system. A plurality of ultrasonic receivers are provided. Each of the receivers has an electronic switch electrically connected to a corresponding one of said components and between said one of said components and another one of the components of the electrical system. The components of the ignition system include an ignition switch operated by an ignition key, an ignition coil and a distributor, and may also include an electronic ignition unit.

A plurality of sealed housings are provided. Each of the housings houses a corresponding one of the components and the corresponding one of the ultrasonic receivers.

The transmitter produces and transmits an ultrasonic signal of a predetermined frequency.

The transmitter combined with the ignition key comprises a housing dimensioned to be held between two fingers of a hand of a user. The housing houses the transmitter and the ignition key extends from the housing.

BRIEF DESCRIPTION OF THE DRAWINGS

In order that the invention may be readily carried into effect, it will now be described with reference to the acompanying drawings, wherein:

FIG. 1 is a block diagram of an embodiment of the vehicular protective system of the invention;

FIG. 2 is a view of an embodiment of the combined ultrasonic transmitter and ignition key of the invention;

FIG. 3 is an end view, taken along the lines III—III, of FIG. 2;

FIG. 4 is a view, on an enlarged scale, in block form and partly in section, of an embodiment of a sealed component of the invention; and FIG. 5 is a view, on an enlarged scale, in block form and partly in section, of an embodiment of another sealed component of the invention.

DETAILED DESCRIPTION OF THE INVENTION

The vehicular protective system of the invention prevents unauthorized operation of an automotive vehicle having an electrical system. The electrical system includes a plurality of components, and an ignition system having a plurality of components. The ignition system is started, in the usual manner, by an ignition key.

The components of the electrical system include a battery 1, a starter relay 2, a starter 3, an alternator 4, and an ignition system, as shown in FIG. 1. The ignition system of the electrical system includes an ignition switch 5 (FIG. 1), operated by an ignition key 6 (FIGS. 1 to 3), an ignition coil 7, an electronic ignition 8 in many vehicles, a distributor 9 and spark plugs 10 (FIGS. 1 and 5). Each of the components of the electrical system is known and may comprise any suitable unit for performing the indicated function. The ignition key 6 (FIGS. 1 to 3) may comprise any suitable key, of the usual type, for energizing the starter 3 via the starter relay 2 by operating the ignition switch 5 and by closing the ignition circuit in the usual manner.

The battery 1 is electrically connected to the starter 3 via the starter relay 2, in the usual manner (FIG. 1). The battery 1 is also electrically connected to the alternator 4 via the starter relay 2, in the usual manner (FIG. 1). The alternator 4 is electrically connected to the spark plugs 10 via the distributor 9, in the usual manner (FIG. 1). The ignition switch 5 is electrically connected to the battery 1 via the starter relay 2 and to the ignition coil 7, in the usual manner (FIG. 1). The ignition coil 7 is electrically connected to the distributor 9, which is electrically connected to the spark plugs 10, in the usual manner, when the distributor functions mechanically. The electronic ignition 8, when included in the system, is electrically connected between the ignition coil 7 and the distributor 9, when the points and mechanical operation of the distributor are eliminated.

In accordance with the invention, an ultrasonic transmitter 11 of any suitable known type (FIGS. 1 to 3) is combined with the ignition key 6. The ultrasonic transmitter 11 is manually operable, in a known manner, to produce and transmit an ultrasonic signal of a predetermined frequency such as, for example, 40,000 Hertz.

The ultrasonic transmitter 11 combined with the ignition key 6 comprises a housing 12 (FIGS. 2 and 3) dimensioned to be held between two fingers of a hand of a user. The housing 12 houses the ultrasonic transmitter 11. As shown in FIGS. 1 to 3, the ignition key 6 extends from the housing 12.

A plurality of ultrasonic receivers 13, 14, 15 and 16 of any suitable known type are provided. Since the ultrasonic receivers 13, 14, 15 and 16 are essentially identical, only the ultrasonic receiver 16 is described in detail herein. As shown in FIG. 5, the ultrasonic receiver 16 has a transducer 17 of any suitable type such as, for example, a microphone, for converting sonic energy to electrical energy. An amplifier 18 of any suitable type (FIG. 5) is electrically connected to the output of the transducer 17 and amplifies the electrical signal produced by said transducer upon the sensing thereby of the ultrasonic signal transmitted by the transmitter 11. An electronic switch 19 (FIG. 5) is electrically connected to the output of the amplifier 18 and is controlled in operation by the amplified electric signal produced by said amplifier.

The ultrasonic receiver 13 (FIG. 1), which is identical to the ultrasonic receiver 16, has an electronic switch electrically connected to the starter 3 and between said starter and the starter relay 2, as shown in FIG. 1. The electronic switch of the ultrasonic receiver 13 is open as long as said receiver fails to receive the ultrasonic signal transmitted by the ultrasonic transmitter 11. This prevents the closing of the circuit between the battery 1 and the starter 3 and thereby prevents the starting and operation of the vehicle, in the absence of the ultrasonic signal from the transmitter 11. The ultrasonic receiver 13 closes the switch thereof when it receives the ultrasonic signal transmitted by the ultrasonic transmitter 11. This permits the closing of the circuit between the starter ignition coil 7 and the starter 3 and thereby permits the operation of the electrical system and, thus, the starting and operation of the vehicle, in the presence of the ultrasonic signal from the transmitter 11.

The ultrasonic receiver 14 (FIGS. 1 and 4), which is identical to the ultrasonic receiver 13, has an electronic switch electrically connected to the alternator 4 and between said alternator and the starter relay 2, as shown in FIG. 1. The electronic switch of the ultrasonic receiver 14 is open as long as said receiver fails to receive the ultrasonic signal transmitted by the ultrasonic transmitter 11. This prevents the closing of the circuit between the alternator 4 and the starter relay 2 and thereby prevents the operation of the electrical system and, thus, the operation of the vehicle, in the absence of the ultrasonic signal from the transmitter 11. The ultrasonic receiver 14 closes the switch thereof when it receives the ultrasonic signal transmitted by the ultrasonic transmitter 11. This permits the closing of the circuit between the alternator 4 and the starter relay 2 and thereby permits the operation of the electrical system and, thus, the operation of the vehicle, in the presence of the ultrasonic signal from the transmitter 11.

The electronic switch of the ultrasonic receiver 15 (FIG. 1) is electrically connected to the electronic ignition 8 and between said electronic ignition and the ignition coil 7, as shown in FIG. 1. The electronic switch of the ultrasonic receiver 15 is open as long as said receiver fails to receive the ultrasonic signal transmitted by the ultrasonic transmitter 11. This prevents the closing of the circuit between the electronic ignition 8 and the ignition coil 7 and thereby prevents the operation of the electrical system and, thus, the operation of the vehicle, in the absence of the ultrasonic signal from the transmitter 11. The ultrasonic receiver 15 closes the switch thereof when it receives the ultrasonic signal transmitted by the ultrasonic transmitter 11. This permits the closing of the circuit between the electronic ignition 8 and the ignition coil 7 and thereby permits the operation of the electrical system and, thus, the operation of the vehicle, in the presence of the ultrasonic signal from the transmitter 11.

The electronic switch 19 of the ultrasonic receiver 16 (FIGS. 1 and 5) is electrically connected to the distributor 9 and between said distributor and the spark plugs 10, as shown in FIGS. 1 and 5. The electronic switch 19 of the ultrasonic receiver 16 is open as long as said receiver fails to receive the ultrasonic signal transmitted by the ultrasonic transmitter 11. This prevents the closing of the circuit between the distributor 9 and the spark plugs 10 and thereby prevents the operation of the electrical system and, thus, the operation of the vehicle, in the absence of the ultrasonic signal from the transmitter 11. The ultrasonic receiver 16 closes the switch thereof when it receives the ultrasonic signal transmitted by the ultrasonic transmitter 11. This permits the closing of the circuit between the distributor 9 and the spark plugs 10 and thereby permits the operation of the electrical system and, thus, the operation of the vehicle, in the presence of the ultrasonic signal from the transmitter 11.

The electrical system of the vehicle may include additional components and such components may be electrically connected to the electronic switches of corresponding ultrasonic receivers. A single electronic switch of a single ultrasonic receiver electrically connected to a single component of the electrical system of the vehicle is sufficient to fully protect the vehicle from unauthorized operation.

In order to prevent bypassing of the electronic switch of an ultrasonic receiver in the system of the invention by jump wires, each component of the electrical system of the vehicle is sealed in an individual housing with its corresponding ultrasonic receiver. The starter 3 and the ultrasonic receiver 13 are sealed in a housing to prevent tampering with either said starter or said receiver and to prevent bypassing of the electronic switch of said receiver by jump wire. The alternator 4 and the ultrasonic receiver 14 are sealed in a housing 20 (FIG. 4) to prevent tampering with either said alternator or said receiver and to prevent bypassing of the electronic switch of said receiver jump wire. The electronic ignition 8 and the ultrasonic receiver 15 are sealed in a housing to prevent tampering with either said electronic ignition or said receiver and to prevent bypassing of the electronic switch of said receiver by jump wire. The distributor 9 and the ultrasonic receiver 16 are sealed in a housing 21 (FIG. 5) to prevent tampering with either said distributor or said receiver and to prevent bypassing of the electronic switch 19 of said receiver by jump wire.

While the invention has been described by means of a specific example and in a specific embodiment, I do not wish to be limited thereto, for obvious modifications will occur to those skilled in the art without departing from the spirit and scope of the invention.

I claim:

1. A vehicular protective system for preventing unauthorized operation of an automotive vehicle having an electrical system including a plurality of components and an ignition system having a plurality of components and started by an ignition key, said vehicular protective system comprising an ultrasonic transmitter combined with the ignition key and manually operable to produce and transmit an ultrasonic signal; and an ultrasonic receiver having an electronic switch electrically connected to at least one of the components of the electrical system of a vehicle and between said one of said components and another one of the components of said electrical system, said switch being open upon the failure of said receiver to receive the signal transmitted by said transmitter thereby preventing the operation of said electrical system and the operation of the vehicle, said receiver closing said switch upon receiving the signal transmitted by said transmitter thereby permitting the operation of said electrical system and the operation of said vehicle.

2. A vehicular protective system as claimed in claim 1, further comprising a sealed housing housing said one of said components and said ultrasonic receiver to prevent tampering with said one of said components and with said ultrasonic receiver.

3. A vehicular protective system as claimed in claim 1, wherein said components include a starter, a starter relay, an alternator and an ignition system, and further comprising a plurality of ultrasonic receivers each having an electronic switch electrically connected to a corresponding one of said components and between said one of said components and another one of the components of said electrical system.

4. A vehicular protective system as claimed in claim 1, wherein said transmitter produces and transmits an ultrasonic signal of a predetermined frequency.

5. A vehicular protective system as claimed in claim 1, wherein the transmitter combined with the ignition key comprises a housing dimensioned to be held between two fingers of a hand of a user, said housing housing said transmitter, and said ignition key extending from the housing.

6. A vehicular protective system as claimed in claim 3, further comprising a plurality of sealed housings each housing a corresponding one of said components and the corresponding one of said ultrasonic receivers.

7. A vehicular protective system as claimed in claim 6, wherein the components of said ignition system include an ignition switch operated by an ignition key, an ignition coil and a distributor.

8. A vehicular protective system as claimed in claim 7, wherein said ignition system further comprises an electronic ignition unit.

* * * * *